US 6,606,850 B2

(12) United States Patent
Logvinov et al.

(10) Patent No.: US 6,606,850 B2
(45) Date of Patent: Aug. 19, 2003

(54) HYBRID HIGH TEMPERATURE FUEL CELL VOLUME EXPANSION HEAT ENGINE

(75) Inventors: Sergey Anatolievich Logvinov, Saint Petersburg (RU); Nikolay Shkolnik, West Hartford, CT (US); Pavel Yurievich Koblents, Saint Petersburg (RU); Andrey Nikolaevich Shliakhtenko, Sosnovy Bor (RU); Sam Kogan, Newton Center, MA (US); Dmitry Ivanovich Pivunov, Saint Petersburg (RU); Vasily Gennadievich Abashkin, Saint Petersburg (RU)

(73) Assignee: En Gen Group, Inc., Boston, MA (US)

( * ) Notice: Subject to any disclaimer, the term of this patent is extended or adjusted under 35 U.S.C. 154(b) by 0 days.

(21) Appl. No.: 10/022,921

(22) Filed: Dec. 18, 2001

(65) Prior Publication Data

US 2002/0092287 A1 Jul. 18, 2002

Related U.S. Application Data

(60) Provisional application No. 60/260,863, filed on Jan. 10, 2001.

(51) Int. Cl.[7] .................................................. F02C 5/00
(52) U.S. Cl. ........................................... 60/39.6; 60/698
(58) Field of Search .................... 60/39.6, 698; 429/13, 429/17, 20

(56) References Cited

U.S. PATENT DOCUMENTS

| 3,336,162 A | * | 8/1967 | Zachmann |
| 5,413,879 A | * | 5/1995 | Domeracki et al. ........... 429/30 |
| 5,426,940 A | * | 6/1995 | Tomoiu ........................ 60/595 |
| 5,541,014 A | * | 7/1996 | Micheli et al. ............... 429/19 |
| 5,678,647 A | * | 10/1997 | Wolfe et al. ................ 180/65.3 |
| 5,968,680 A | * | 10/1999 | Wolfe et al. .................. 429/13 |
| 6,162,554 A | * | 12/2000 | Nolscher et al. .............. 429/13 |

* cited by examiner

Primary Examiner—Hoang Nguyen
(74) Attorney, Agent, or Firm—Edward Dreyfus

(57) ABSTRACT

A power plant includes a high temperature fuel cell, a volume expansion heat engine producing mechanical energy, and a combustion chamber coupled to receive from said fuel cell at least a portion of unconsumed fuel and apply high pressure combusted gases to the engine. A reformer can feed fuel to said fuel cell. A distributor distributes fuel cell exhaust fuel selectively to the reformer and the combustion chamber and varies the ratio of exhaust fuel fed to the reformer and combustion chamber in accordance with predetermined power desired from said fuel cell and engine.

17 Claims, 2 Drawing Sheets

HYBRID HIGH TEMPERATURE FUEL CELL VOLUME EXPANSION HEAT ENGINE

RELATED APPLICATION

Priority is claimed to U.S. Provisional Patent Application Ser. No. 60/260,863, filed Jan. 10, 2001.

FIELD OF THE INVENTION

The invention refers to power plants that include high temperature fuel cells, in which hydrocarbon fuel is used as initial fuel.

BACKGROUND OF THE INVENTION

High temperature fuel cells efficiently convert fuel energy into electric power. An electrochemical reaction involving the fuel (usually a mixture of hydrogen and carbon monoxide) and air takes place in the fuel cell, which produces electric power. However, not all of the energy in the fuel is converted into electric power; energy is lost for two reasons. First, the efficiency of the electrochemical conversion is no greater than 0.6—the rest of the chemical energy turns to heat. Second, the oxidation products (carbon dioxide and water vapors), which are generated in the result of fuel cell reaction, dilute the flow of fuel along the length of fuel channels. The partial pressures of the fuel components decrease, reducing the reaction rate.

To counteract this, more fuel than can possibly be consumed is fed into the fuel cell, which is why there is always unused fuel in the output flow. The remnants of this fuel, together with the oxidation products, are commonly utilized in co-generation engines which produce additional electric power. Attempts are also made to utilize the heat generated by fuel cells, e.g. in power plants to heat fuel or air that is supplied to the fuel cell.

Power plants are known in which unconverted fuel energy in a high-temperature fuel cell is utilized by means of a gas turbine, as in the inventions described in Japanese patents (1) No. 63119163 "FUEL CELL GENERATING SYSTEM", priority date—Nov. 7, 1986, publication date—May 23, 1988, IPC H01M 8/06, (2) Japan patent No. 4065066 "FUEL CELL AND CARBON DIOXIDE GAS FIXED COMPOUND POWER GENERATION METHOD", priority date—Jul. 5, 1990, publication date—Mar. 2, 1992, IPC H01M 8/06, and (3) Japan patent No. 1021463 "DEVICE AND METHOD OF REPRODUCING ELECTRICITY AND BY-PRODUCING HYDROGEN", priority date—Dec. 19, 1996, publication date—Aug. 11, 1998, IPC H01M 8/06 and (4) U.S. Pat. No. 5,541,014 "INDIRECT-FIRED GAS TURBINE DUAL FUEL CELL POWER CYCLE", priority date—Oct. 23, 1995, publication date—Jul. 30, 1996, IPC H01M 8/06. These are designed as stationary power plants for electrical generation stations. The use of gas turbines in power plants with fluctuating loads (for example, those used in vehicles) is less effective. In addition, low power turbines (under 10–20 kW) have low efficiencies.

The power plant described in (5) U.S. Pat. No. 5,968,680, "HYBRID ELECTRICAL POWER SYSTEM", priority date—Sep. 10, 1997, publication date—Oct. 19, 1999, IPC H01M 8/06, comprises a fuel cell, combustion chamber intended for combusting the fuel remnants at the fuel cell outlet, and a turbine. The turbine turns an electric generator. The power plant also comprises a reformer, which converts hydrocarbon fuel into a fuel for the high-temperature fuel cell. It is possible to vary the power of the power plant by regulating the fuel supply to the fuel cell. To increase the power output of the turbine, additional fuel can be supplied to the combustion chamber. This power plant is intended for operation in stationary power generating units and is not efficient under fluctuating loads.

BRIEF SUMMARY OF EXEMPLARY EMBODIMENTS OF THE INVENTION

The present invention solves the problem of how to maximize energy utilization of the hydrocarbon fuel in a power plant with a high temperature fuel cell, which is capable of performing efficiently under fluctuating loads. Maximum utilization of the fuel energy makes it possible to reduce the power and size of the fuel cell used in the power plant.

The first embodiment of the power plant comprises a reformer which converts hydrocarbon fuel into a fuel mixture comprising mainly of hydrogen and carbon monoxide; a high temperature fuel cell comprising an air duct with an inlet and an outlet and a fuel channel with a corresponding inlet and outlet; a distributor with one inlet and two outlets; a combustion chamber with fuel inlet, air inlet and outlet; and a volume expansion engine with an inlet for supplying the working fluid. The outlet of the reformer is connected to the inlet of the fuel channel of the high temperature fuel cell. The outlet of the fuel channel of the high temperature fuel cell is connected to the inlet of the distributor; one outlet is connected to the fuel inlet of the combustion chamber, while the other outlet is connected to the inlet of the reformer. The outlet of the air duct of the high temperature fuel cell is connected to the air supply inlet of the combustion chamber, while the outlet of the combustion chamber is connected to the volume expansion engine.

Hydrocarbon fuel is fed to the reformer where it is converted into a mixture of hydrogen and carbon monoxide. The hydrogen and carbon monoxide are then fed to the fuel channel and oxygen (air) is fed to the air duct of the high temperature fuel cell. The chemical energy of the air (oxygen), hydrogen and carbon monoxide is converted into electric energy via electrochemical reactions. Unreacted hydrogen and carbon monoxide, together with the oxidation products, are then fed to the combustion chamber. Air containing unused oxygen is also supplied to the combustion chamber.

Unlike known systems, a quantity of hydrogen and carbon monoxide, together with oxidation products, carbon dioxide and water vapor, is again fed to the reformer inlet. The increased concentration of carbon dioxide and water vapor in the reformer increases the efficiency of the reformer, as well as the output of hydrogen and carbon monoxide.

The outlet of the combustion chamber is connected to the volume expansion engine. Engines of this type are better suited to operation under varying loads than turbines. They can also operate effectively at low power. The hot combustion gases perform mechanical work as a result of their expansion in the volume expansion engine. This mechanical energy can be converted into extra electric power by means of electric generator.

The distributor distributes the output from the outlet of the high temperature fuel cell either to the combustion chamber (power output from the volume expansion engine increases rapidly) or back to the reformer (efficiency of fuel utilization in the fuel cell increases). The distributor provides better power plant performance under varying loads.

In one exemplary embodiment according to the principles of the present invention, the combustion chamber is connected to the reformer via a heat exchanger, which heats the reformer. This design provides two benefits. First, high temperature heat from the combustion chamber intensifies the hydrocarbon fuel conversion processes in the reformer. Second, transferring some of the heat to the reformer reduces the temperature of combustion products. This, in turn, reduces the demand on part of volume expansion engine; the lower temperature does not requires expensive alloys and therefore reduces manufacturing costs.

The volume expansion engine can be connected to an electric generator to produce additional electric power. To do this, fuel is fed to the fuel cell at a higher rate than it can be consumed. The excess fuel is then burned in the combustion chamber or is fed back to the reformer. The distributor regulates this ratio to maximize efficiency of the power plant at a given load.

Also, a heat exchanger can be installed on the high temperature fuel cell to increase the temperature of the fuel fed to the reformer and air supplied to the high temperature fuel cell. This increases the efficiency of the power plant.

Also, to overcome aerodynamic losses, a pump can be installed between the distributor and reformer inlet to increase the pressure of the products supplied from the output of the fuel channel of high temperature fuel cell.

A second exemplary embodiment of the power plant comprises a reformer for converting hydrocarbon fuel into a fuel mixture consisting mainly of hydrogen and carbon monoxide; a high temperature fuel cell comprising an air duct with an inlet and an outlet and a fuel channel with a corresponding inlet and outlet; a distributor with one inlet and two outlets; a combustion chamber with fuel supply inlet, air supply inlet and outlet; and a volume expansion engine comprising an inlet for supplying the working fluid, one regulating valve, the inlet of which is connected to air inlet and another regulating valve, the inlet of which is connected to a hydrocarbon fuel inlet.

The outlet of the reformer is connected to the inlet of the fuel channel of the high temperature fuel cell. The outlet of the fuel channel of the high temperature fuel cell is connected to the inlet of the distributor; one outlet is connected to the fuel inlet of the combustion chamber, while the other outlet is connected to the inlet of the reformer. The outlet of the air duct of the high temperature fuel cell is connected to the air supply inlet of the combustion chamber, while the outlet of the combustion chamber is connected to the volume expansion engine. The outlet of the first regulating valve of the volume expansion engine is connected to the air supply inlet of the combustion chamber, while the second regulating valve is connected to the additional fuel supply inlet of the combustion chamber.

The second embodiment of the power plant increases the rate at which the power output of the volume expansion engine can be increased. This makes it possible to improve the operation of the power plant under varying loads where it is necessary to rapidly increase the power output. Otherwise, operation of the second embodiment of the power plant is analogous to the first.

In the specific case of the second embodiment, the combustion chamber is connected to the reformer via a heat exchanger which transfers heat to the reformer. The volume expansion engine can be mechanically connected to an electric generator. The high temperature fuel cell can comprise an additional heat exchanger connected to a device for heating fuel supplied to the reformer, and a device for heating air supplied to the fuel cell. An additional pump can be installed between the distributor and the reformer inlet.

Power plants designed according to the first and second embodiments offer the most efficient utilization of hydrocarbon fuel energy.

BRIEF DESCRIPTION OF THE DRAWINGS

Other objects and benefits afforded by the present invention will become apparent with the following detailed description, when taken in view of the appended drawings, in which.

DETAILED DESCRIPTION OF EMBODIMENT OF THE INVENTION

Figure 1:
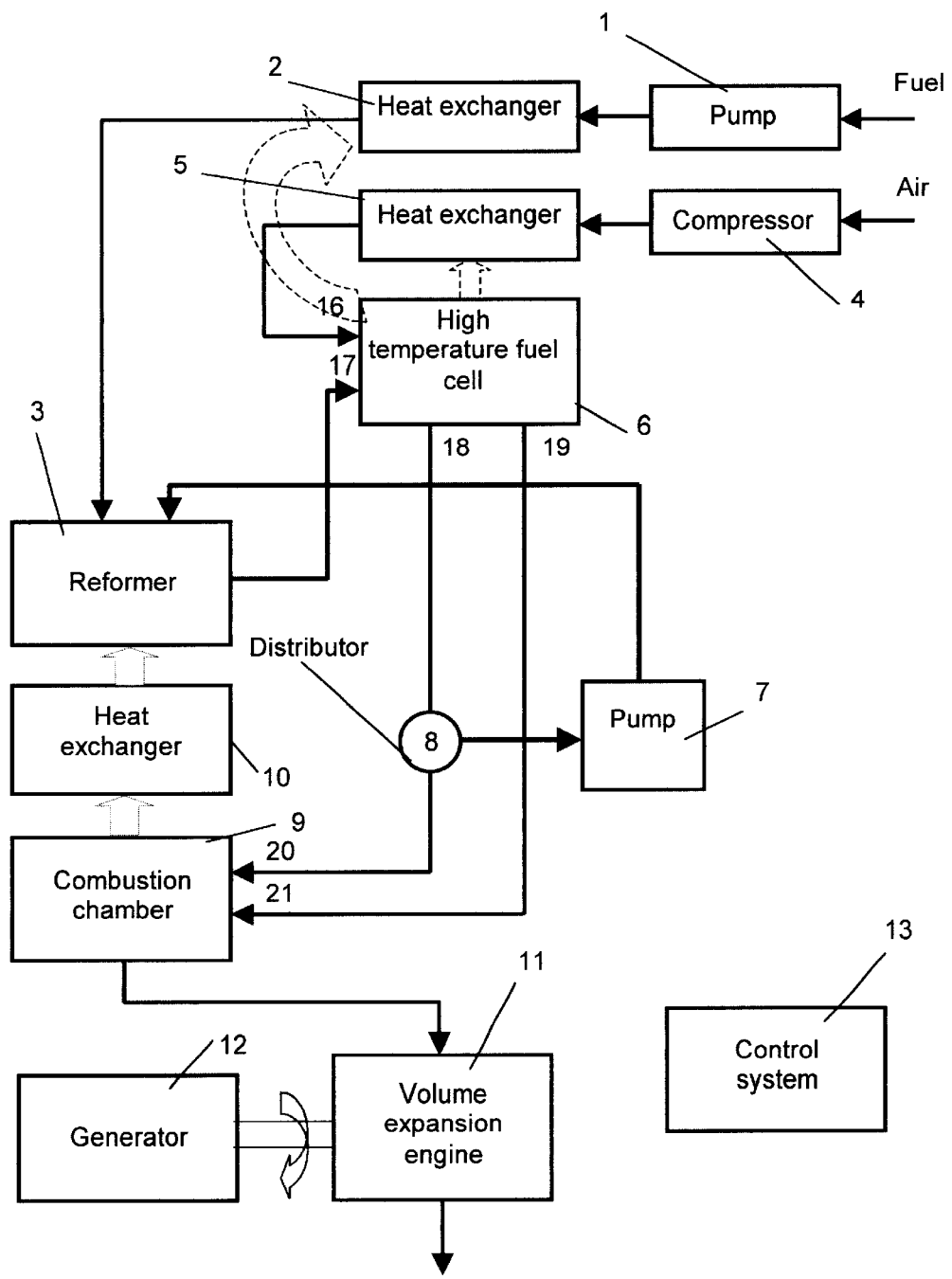
FIG. 1 is a basic schematic of the power plant.

The power plant in accordance with the first design option (see FIG. 1) comprises pump 1 that feeds hydrocarbon fuel through heat exchanger 2 to the inlet of reformer 3. The outlet of reformer 3 is connected to the inlet 17 of the fuel channel of high temperature fuel cell 6. The inlet 16 of the air duct of high temperature fuel cell 6 is connected via heat exchanger 5 to the outlet of air supply compressor 4. The outlet 18 of fuel channel of high temperature fuel cell 6 is connected to distributor 8. One outlet of distributor 8 is connected to fuel inlet 20 of combustion chamber 9, while the other outlet of distributor 8 is connected to additional pump 7, the outlet of which is connected to the inlet of reformer 3. The outlet 19 of air duct of high temperature fuel cell 6 is connected to the air inlet 21 of combustion chamber 9. The outlet of combustion chamber 9 is connected to the inlet of volume expansion engine 11 that moves electric generator 12.

Volume expansion engine 11 can be of the internal combustion engine type, in which case its combustion chamber, i.e. its cylinder or cylinders, is internal to the engine block or housing; or of the external combustion engine type, in which the combustion chamber (sometimes called "burner") is external to the engine block or housing.

Combustion chamber 9 is equipped with heat exchanger 10 that heats reformer 3. Heat exchangers 2 and 5 remove excess heat from high temperature fuel cell 6 and serve to heat fuel and air, respectively. Controller 13 controls the power plant operation.

The power plant in accordance with the first embodiment operates as follows.

Hydrocarbon fuel (e.g., methane) is fed by pump 1 to reformer 3 through heat exchanger 2 (where it is further heated). In the reformer, the hydrocarbon fuel is mixed with the remnants of fuel containing carbon dioxide and water vapor and is converted into a mixture containing hydrogen and carbon monoxide. Reformer 3 (which operates in at 800–850° C.) is further heated with high temperature heat from combustion chamber 9 via heat exchanger 10. The temperature increase in reformer 3 changes the reaction dynamics to increase output of hydrogen and carbon monoxide. An increase in hydrogen and carbon monoxide output is also attained by returning a portion of the products from the outlet 18 of the fuel channel of high temperature fuel cell 6 through distributor 8 and pump 7.

Electrochemical reactions between hydrogen and carbon monoxide on the one side and air (oxygen) on the other side proceed in high temperature fuel cell 6. Electric power is produced as a result of these reactions. A fuel cell with solid electrolyte (for example, a mixed oxide of zirconium and yttrium) may be used as a high temperature fuel cell 6. The operation temperature of such a fuel cell is 700–1000° C. The heat from high temperature fuel cell 6 may be used to heat air in heat exchanger 5 and hydrocarbon fuel in heat exchanger 2.

Air (oxygen) is supplied to high temperature fuel cell 6 by compressor 4 through heat exchanger 5.

The remnants of air and fuel are fed from the outlet of high temperature fuel cell 6 to combustion chamber 9, where the fuel is combusted. The combustion products are then supplied to volume expansion engine 11. Combustion chamber 9 provides a temperature of 1100–1150° C. A portion of the heat from combustion chamber 9 is then fed to reformer 3, which increases efficiency (as noted above). The presence of heat exchanger 10 on combustion chamber 9 reduces the temperature of the combustion products at the outlet. Therefore, volume expansion engine 11 can operate at lower temperature (700–850° C.).

Volume expansion engine 11 can be a piston engine, rotary engine, free-piston engine, axial piston engine, etc. It is used to drive electric generator 12, and can also drive pump 1 and compressor 4. Controller 13 governs the different operation modes of the power plant; in particular, it controls the operation of pump 1, compressor 4, and distributor 8.

When the power plant output is increased, pump 1 puts out an increased amount of fuel and compressor 4 puts out an increased amount of air, while distributor 8 directs the major part of unused fuel from outlet 18 of fuel cell 6 to inlet 20 of combustion chamber 9, thus increasing the output of volume expansion engine 11. During steady state operation, the major part of unused fuel from outlet 18 of fuel cell 6 is fed to reformer 3 through distributor 8 and pump 7.

The improvement in power plant operation for dynamic conditions offered by the first design option makes it possible to direct the flow from the fuel channel of high temperature fuel cell 6 (with the aid of distributor 8) either to combustion chamber 9 or to the inlet of reformer 3.

Figure 2:
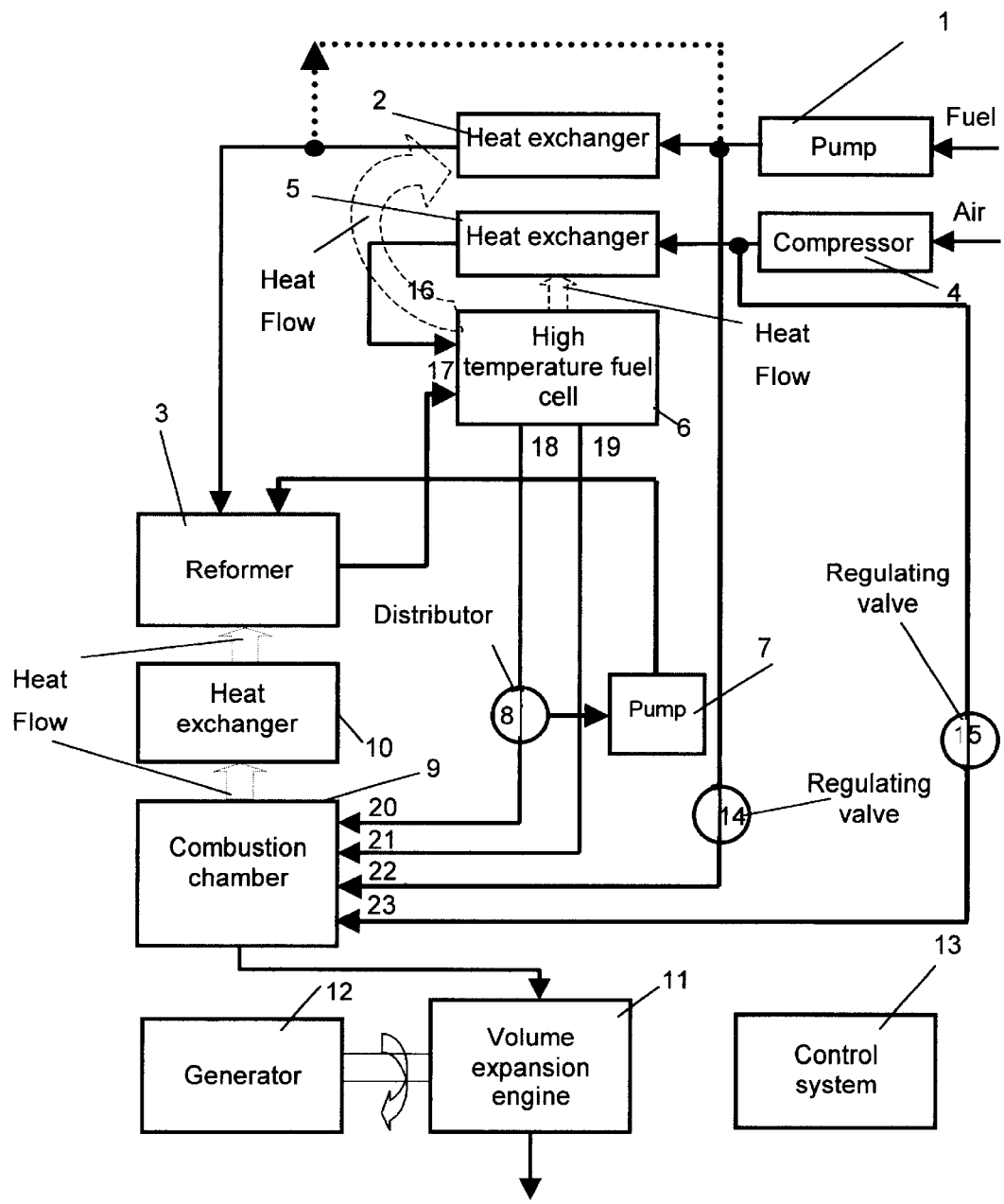
FIG. 2 is a schematic of the power plant, which additionally comprises a mixer and regulating valves.

The second embodiment of the power plant (see FIG. 2) additionally features regulating valve 14, through which extra hydrocarbon fuel is fed from the outlet of pump 1 to inlet 22 of combustion chamber 9; and regulating valve 15, through which extra air is supplied from the outlet of compressor 4 to inlet 23 of combustion chamber 9. Alternately, if hot hydrocarbon fuel is desired to feed valve 14, it can be sourced from the output side of heat exchanger 2 as represented by the dotted line.

The power level of volume expansion engine 11, when it is supplied with extra fuel and air through regulating valves 14 and 15 (see FIG. 2), is increased, which is especially important for vehicles. An example of a volume expansion engine comprising a mixer intended for mixing combustion products and hydrocarbon fuel is described in U.S. Pat. No. 5,311,739.

This embodiment of the power plant is very efficient for loads, which vary rapidly and over a wide range. Previous designs of hybrid power plants with fuel cells rely on the fuel cell to generate 60–80% of the system power; the turbine generates the rest of the power (20–40%). In the present invention, with the power plant operating at maximum power, this ratio is substantially different, as described in the following example. It should be noted that this is only an example, and that different embodiments of the invention may use other power distribution ratios, which are determined by the nature of the specific loads.

Example. The system is designed so that at nominal or average power output, the high temperature fuel cell provides 70%–90% of the nominal (average) power, while the volume expansion engine provides the other 10%–30% of the nominal power. When more power is needed, the fuel cell will work at its maximum level providing as much as 20% of the maximum power, while the volume expansion engine provides the remaining 80%. Such a power distribution makes it possible to use a smaller fuel cell, especially if fuel and air are supplied under high pressure.

The power plant according to the present invention provides the following advantages:

Fuel is utilized more efficiently because combustion chamber heat is utilized more efficiently and unprocessed fuel from the outlet of the fuel channel of the high temperature fuel cell is fed back into the reformer.

The dynamic characteristics of the system are improved over a wider range of loads by employing a volume expansion engine and by regulating the fuel supply to the combustion chamber.

Dynamic characteristics of the power plant can be further improved by providing additional fuel and air to the volume expansion engine, which makes it possible to use the power plant in vehicles.

Various improvements and modifications can be made to the herein disclosed exemplary embodiments without departing from the scope of the present invention.

What is claimed is:

1. A power plant comprising:
   (a) a reformer for converting hydrocarbon fuel into a fuel mixture including hydrogen and carbon monoxide;
   (b) a high temperature fuel cell comprising an air duct with an inlet and an outlet and a fuel channel with corresponding inlet and outlet;
   (c) a distributor having one inlet and two outlets;
   (d) a combustion chamber with a fuel inlet, air inlet, and outlet;
   (e) a volume expansion engine having an inlet for supplying a working fluid;
      wherein the outlet of said reformer is connected to the inlet of fuel channel of said high temperature fuel cell; the outlet of said fuel channel of high temperature fuel veil is connected to the inlet of said distributor, the first outlet of which is connected to fuel inlet of said combustion chamber and the second outlet of which is connected to the inlet of the reformer; the outlet of sir duct of said high temperature fuel cell is connected to the air supply inlet of said combustion chamber; the outlet of said combustion chamber is connected to said volume expansion engine.

2. The power plant of claim 1 wherein said combustion chamber is connected to the reformer through a heat exchanger for heating said reformer.

3. The power plant of claim 1 wherein said volume expansion engine is mechanically connected to an electric generator.

4. The power plant of claim 1 wherein said high temperature fuel cell contains an additional heat exchanger, which is connected to a device for heating the fuel fed into the reformer and to another device for heating the air supplied to the high temperature fuel cell.

5. The power plant of claim 1 further comprising an additional pump [is] installed between said distributor and the inlet of said reformer.

6. A power plant comprising:
   (a) a reformer for converting hydrocarbon fuel into a fuel mixture including hydrogen and carbon monoxide;

(b) a high temperature fuel cell comprising an air duct with an inlet and an outlet and a fuel channel with corresponding inlet and outlet;
(c) a distributor having one inlet and two outlets;
(d) a combustion chamber with a fuel inlet, air inlet, and outlet;
(e) a volume expansion engine having an inlet for supplying a working fluid;
(f) first regulating valve, the inlet of which is connected to air supply inlet;
(g) second regulating valve the inlet of which is connected to the inlet of hydrocarbon fuel,
wherein the outlet of said reformer is connected to the inlet of fuel channel of said high temperature fuel cell; the outlet of said fuel channel of high temperature fuel cell is connected to the inlet of said distributor, the first outlet of which is connected to the fuel inlet of said combustion chamber and the second outlet of which is connected to the inlet of the reformer; the outlet of the air duct of said high temperature fuel cell is connected to the air supply inlet of said combustion chamber; the outlet of said combustion chamber is connected to said volume expansion engine; the outlet of said first regulating valve is connected to the air supply inlet of the combustion chamber; the outlet of said second regulating valve is connected to an additional fuel inlet of said combustion chamber.

7. The power plant of claim 6 wherein said combustion chamber is connected to the reformer through a heat exchanger for heating said reformer.

8. The power plant of claim 6 wherein said volume expansion engine is mechanically connected to an electric generator.

9. The power plant of claim 6 wherein said high temperature fuel cell includes an additional heat exchanger connected to a device for beating the fuel fed into the reformer and to another device for heating the air supplied to the high temperature fuel cell.

10. The power plant of claim 6 further comprising an additional pump installed between said distributor and the inlet of said reformer.

11. A hybrid power apparatus comprising:
a high temperature fuel cell for producing electrical energy,
a volume expansion heat engine for producing mechanical energy,
a combustion chamber coupled for receiving at least a portion of the unconsumed fuel from said fuel cell and applying high pressure combusted gases to said engine,
a reformer for feeding fuel to said fuel cell,
a source of hydrocarbon fuel for selectively feeding variable amounts of fuel to said reformer and said combustion chamber, and
a distributor for distributing fuel cell exhaust fuel selectively to said reformer and said combustion chamber.

12. A power apparatus as set forth in claim 11, wherein said distributor varies the ratio of exhaust fuel fed to the reformer and combustion chamber in accordance with predetermined power requirements desired from said fuel cell and engine.

13. A power apparatus as set forth in claim 11, wherein said fuel source applies hydrocarbon fuel to said combustion chamber for rapidly increasing the power output of said engine.

14. A power apparatus as set forth in claim 11, wherein said engine comprises at least one piston riding in a cylinder.

15. A power apparatus as set forth in claim 11, further including an electric generator driven by said engine.

16. A power apparatus as set forth in claim 11, wherein the nominal power rating of said fuel cell is less than 50% of the nominal power rating of said engine.

17. A power apparatus of claim 11 further comprising a heat exchanger for drawing heat from the combustion chamber and applying such heat to the reformer.

* * * * *

UNITED STATES PATENT AND TRADEMARK OFFICE
CERTIFICATE OF CORRECTION

PATENT NO. : 6,606,850 B2  Page 1 of 1
DATED : August 19, 2003
INVENTOR(S) : Logvinov et al.

It is certified that error appears in the above-identified patent and that said Letters Patent is hereby corrected as shown below:

Column 6,
Line 46, change the word "sir" to -- air --.
Line 63, delete the word "[is]".

Signed and Sealed this

Twenty-fifth Day of November, 2003

JAMES E. ROGAN
*Director of the United States Patent and Trademark Office*